United States Patent [19]

Weibel

[11] Patent Number: 5,190,669
[45] Date of Patent: Mar. 2, 1993

[54] PURIFICATION OF WASTE STREAMS

[75] Inventor: A. Thomas Weibel, Cranbury, N.J.

[73] Assignee: FMC Corporation, Philadelphia, Pa.

[21] Appl. No.: 797,606

[22] Filed: Nov. 25, 1991

Related U.S. Application Data

[63] Continuation-in-part of Ser. No. 666,751, Mar. 8, 1991, abandoned.

[51] Int. Cl.$^5$ ............................................. C02F 1/78
[52] U.S. Cl. .................................. 210/759; 210/760; 210/917; 162/161
[58] Field of Search ............... 210/759, 760, 763, 908, 210/909, 917; 162/161

[56] References Cited

U.S. PATENT DOCUMENTS

| | | | |
|---|---|---|---|
| 3,041,139 | 6/1962 | D'Addieco et al. | 23/114 |
| 3,082,146 | 3/1963 | Wentworth et al. | 167/17 |
| 3,737,374 | 6/1973 | Stern et al. | 195/5 |
| 3,945,917 | 3/1976 | Foster | 210/28 |
| 4,049,546 | 9/1977 | Rock | 210/30 R |
| 4,219,418 | 8/1980 | Pilon | 210/50 |
| 4,259,149 | 3/1981 | Jaszka et al. | 162/29 |
| 4,311,598 | 1/1982 | Verachtert | 210/757 |
| 4,370,199 | 1/1983 | Orndorff | 162/161 |
| 4,416,786 | 11/1983 | Knorre et al. | 210/759 |
| 4,443,342 | 4/1984 | Stas et al. | 210/759 |
| 4,478,683 | 10/1984 | Orndorff | 162/161 |
| 4,532,007 | 7/1985 | Noren | 162/161 |
| 4,729,835 | 3/1988 | McNeillie et al. | 210/759 |
| 4,756,800 | 7/1988 | Springer et al. | 162/64 |
| 4,781,840 | 11/1988 | Schilling et al. | 210/730 |
| 4,792,407 | 12/1988 | Zeff et al. | 210/748 |
| 4,851,128 | 7/1989 | Rose | 210/669 |
| 4,874,521 | 10/1989 | Newman et al. | 210/639 |
| 4,895,662 | 1/1990 | Stevens | 210/692 |
| 5,043,080 | 8/1991 | Cater et al. | 210/759 |

Primary Examiner—Thomas Wyse
Attorney, Agent, or Firm—R. E. Elden; P. C. Baker; R. L. Andersen

[57] ABSTRACT

The present invention is a process for decreasing the concentration of a lignin-containing organic carbon in an aqueous system by a combination of ozone and hydrogen peroxide. The process is particularly useful for decolorizing lignin-containing aqueous solutions such as effluents from a pulp mill.

4 Claims, No Drawings

PURIFICATION OF WASTE STREAMS

This is a continuation-in-part of U.S. application Ser. No. 666,751 filed Mar. 8, 1991, now abandoned.

This invention concerns a process to purify aqueous systems containing lignin derivatives, in particular pulp mill effluents.

Industrial waste stream effluents present decontamination or purification problems which are quite different from the problems of municipal sewage treatment. The waste stream from each industrial process type is unique to that process and requires specialized rectification. Common contaminants include excess acidity or basicity (a low or high pH), color, chemical oxidation demand (COD), biological oxidation demand (BOD) and chloride or other ions. Color contamination of surface water presents an especially visible aesthetic problem as well as an adverse effect upon aquatic vegetable and animal life caused by altered light penetration of the surface water. Color also provides a simple indicator of the efficacy of the purification process.

The effluent from pulp mills often has a characteristic black or very dark brown color, even after the waste has experienced the usual waste treatment scheme of primary clarification, aeration, and secondary clarification. The molecules which are primarily responsible for this very intense color are thought to be degraded, oxidized lignins which are separated from the pulp primarily at the first caustic extract stage of the bleach plant. Lignin-containing effluent from chemical pulp mills is a complex mixture containing sugars, aromatics, ethers and other organic compounds including chlorocarbons, some of which are chronic toxins. These molecules pass unchanged through the waste treatment plant because they are refractory towards the biological treatment in the aeration basin.

In the past, the reason to remove color from pulp mill and other waste waters was entirely aesthetic. Recently it has been recognized that part of this color is related to COD and BOD and often includes toxic halogenated organics. The emphasis has therefore switched to oxidizing those molecules which consume oxygen. Nonetheless, the problem remains the same. Much research has been directed toward reducing the "color" of pulp mill effluents. The reason is, in part, because color difference is easy to measure and color reduction is indicative of the decrease of BOD, COD, and other contaminants.

The prior art processes for treating industrial effluents can be separated into four major categories, biological, adsorption/absorption, chemical neutralization and physical treatment. Often two or more types of treatment are required.

Biological treatment has ranged from elaborate activated sludge treatment plants to relatively unsophisticated "wetlands" processing. However, as U.S. Pat. No. 4,851,128 discloses even after standard primary clarification, aeration, and secondary clarification, pulp mill effluents remain highly colored and are high in absorbable organic halogens (AOX). Further, the sludges from the clarification steps require disposal either by incineration, landfill or other such expensive alternatives.

U.S. Pat. No. 4,851,128 teaches contacting the waters with a cationic flocculant followed by adsorbing the residual color with activated carbon and, after exhaustion, regenerating the carbon by pyrolysis. Other adsorption and absorption processes utilize macroreticular weak anion resin (U.S. Pat. No. 4,049,546); an activated resin (U.S. Pat. No. 4,259,149); a macroporous resin (U.S. Pat. No. 4,895,662); and by absorption into barium sulfate during precipitation (U.S. Pat. No. 3,945,917).

Typical chemical neutralization processes are disclosed in U.S. Pat. No. 4,049,546, such as, the mini-lime process in which 1000 to 2000 mg/l calcium hydroxide is added to pulp mill effluent to precipitate a calcium-organic precipitate, or alternatively, alum is employed to form an aluminum-organic precipitate. The patent discloses that such processes suffer the disadvantage of requiring large quantities of expensive chemicals, and additionally are severely hampered by sludge handling problems. Neutralization processes include precipitation by polyvalent anions and cations, pH adjustment with suitable alkaline or acidic materials such as limestone, lime, sulfuric acid, sulfur dioxide and the like.

Common physical processes include sedimentation, dissolved air flotation, filtering, and sparging with air or an inert gas. U.S. Pat. No. 4,874,521 teaches a process in which caustic effluent (pH 8-10) from an extractor stage is heated under pressure at 150° C. to 200° C., followed by neutralizing to pH 2.6-3.8 to flocculate organic material and subsequently to separate the floc from the residual liquid by dissolved air flotation. Total evaporation of the effluent cannot be employed with waste streams containing halogens because of corrosion of the evaporator. Further, the cost of energy is exorbitant if the effluent solution is dilute.

U.S. Pat. No. 4,792,407 teaches that organic compounds, including the refractory lignin-containing wastewater from manufacturers of wood products can be decolorized with a combination of ozone, ultraviolet radiation (UV) and hydrogen peroxide. However, UV irradiation of liquid streams is not practical when the liquids contain large quantities of organics because the lamp surfaces quickly become fouled with opaque deposits if immersed in the liquid, while the UV fails to penetrate the liquid if the lamp is not immersed in the liquid.

The present invention is a process for decreasing the color of an aqueous lignin-containing solution comprising the steps of:

a. adjusting the pH of the solution to between pH 5 and 10, b. incorporating sufficient hydrogen peroxide into the solution to maintain a concentration of about 0.5 millimoles per liter for at least 20 minutes, and c. incorporating sufficient ozone into the solution to provide from 1 to 3 moles of ozone per mole of hydrogen peroxide incorporated in step b.

Any aqueous system which contains refractory lignin or lignocellulose moieties may be purified by the process of the present invention as well as solutions containing more easily oxidized organic or inorganic moieties. Suitable lignin or lignocellulose waste streams include those from pulp mills; textile mills and processing operations; waste streams containing agricultural waste materials, such as hulls, bran, chaff, husks, and other extracts and fiber; waste streams from fiber processing operations, such as for hemp, linen, jute, and other natural fibers; and agricultural-related waste streams such as, effluent from animal raising facilities and processing plants, agricultural run off, and the like. Other waste streams include those containing nitrogenous materials, such as ammonia; primary, secondary and tertiary amines; imines; azo compounds and the like, as well as sulfur-containing compounds, such as mercaptans, thioethers, thioesters, and the like. The process is particularly useful for waste streams containing a complex mixture of compounds such as lignins and lignin derivatives which may contain resins, terpenes, and other simple and complex molecules composed of mannan, xylan, phenolics, and the like and their chlorinated and sulfur-containing derivatives.

The present invention is surprising in view of U.S. Pat. No. 3,510,424 which teaches that all compounds having a hydroperoxy group or a peroxygen group are equivalent for the destruction of a cyanide. To the contrary, it has unexpectedly been found that peroxydisulfates intensify the color of lignin-containing solutions while hydrogen peroxide is relatively ineffective, even when catalyzed by metals.

Further, U.S. Pat. No. 4,792,407 discloses that the combination of ozone and hydrogen peroxide is sometimes no better than hydrogen peroxide or ozone alone.

The pH of the aqueous solution can vary over a wide range; desirably the pH should be in the range of about 5 to 10 to avoid unnecessary decomposition of hydrogen peroxide. The optimum pH may vary according to the source of the aqueous solution but generally the pH should be about 6 to 8 when the aqueous solution is to be discharged into the environment.

Temperature is not a critical factor in the present process. It is well known that the rate of a reaction is a function of temperature.

The following examples are intended to illustrate other features and advantages of practicing the invention to one skilled in the art and are not intended to limit the scope of the invention.

The invention is exemplified with effluents from pulp mills, either the extractor circuit of a pulp mill or the combined effluent. Some of the effluent samples were dark in color and were diluted to 25% with distilled water (1 volume of effluent plus 3 volumes of distilled water). The transmission of the samples was determined with a Bausch and Lomb spectrophotometer using 465 nm light after the pH was adjusted to 7.6. Alternatively, the absorbance, the negative logarithm of transmission, was reported rather than the transmission percent. Color difference is the percent reduction of absorbance.

COMPARATIVE EXAMPLE 1

A 2×2×2 experiment was designed to determine the effect of varying hydrogen peroxide concentration, pH and temperature on color of pulp mill effluent. In an initial experiment 1 liter of effluent from a pulp mill was adjusted to pH 10.32 and maintained at 40° C. Sufficient hydrogen peroxide was added to provide 0.5 g $H_2O_2$/l (14.7 mmole/l). A sample was periodically withdrawn and diluted with 3 parts of distilled water (diluted to 25%) and the percent transmission (%T) measured at 465 nm. After 30 minutes the %T increased from 12.0% to 19.6% (the absorbance dropping from 0.92 to 0.71, a 24% color reduction). The results of the 2×2×2 experiment are presented as Table I.

Another sample, the center point of the designed experiment, containing 1.5 g/l $H_2O_2$ (44 mmole/l) was adjusted to pH 9.3 and maintained at 65-71° C. The %T increased from 10.2%T initially to 23.6% at 30 minutes; 29.6 at 60 minutes and 48.4%T after 20 hours.

From Table I it is clear that the efficacy of hydrogen peroxide in removing color (increasing % transmission) increases with pH and temperature. At best 1.3 g/l (44 millimols/l) $H_2O_2$ removed only 33% of the color at pH 10.25 in 30 minutes at 63° C.

Further, the data shows how little extra color removal is obtained by tripling the $H_2O_2$ with the absorbance only dropping from 0.64 to .51 (23.6%T to 31%T) at pH 10.25 and 46° C.; merely a 20% color reduction.

COMPARATIVE EXAMPLE 2

A peroxydisulfate (0.25 g $Na_2S_2O_8$) was added to 250 ml of pulp mill effluent with an initial pH of 9.15. The sample was maintained at 71° C. Surprisingly, the transmission dropped from 10.2%T to 8.6%T in 10 minutes and grew progressively darker with time.

COMPARATIVE EXAMPLE 3

Ozone and Hydrogen Peroxide

Run A—About 500 mg (26 mmole/l) of ozone was added to 400 ml of extractor effluent at an initial pH of 8.7. The transmission of a solution (diluted to 25%) increased from 14.4%T to 50.4%T (64% color remained) in 15 minutes.

Run B—On repetition with the addition of 0.1% (7 mmole/l) hydrogen peroxide the transmission increased to 67.0% (26% color remained).

The example was repeated with 130 mg (6.7 mmole) ozone (Run C) with and (Run D) without 0.1% (7 mmole) $H_2O_2$. The transmission increased to 42%T without the added $H_2O_2$ and 37.0%T with the added hydrogen peroxide (respectively 55% and 48% color removed).

COMPARATIVE EXAMPLE 4

Ozone +UV +Hydrogen Peroxide

The combined effect of ozone, UV and hydrogen peroxide was compared on samples of extractor stage effluent as follows:

A. Sufficient hydrogen peroxide was added to 800 ml of extractor effluent at pH of 8.7 to provide 0.3% $H_2O_2$. Ozone was sparged through the solution at the rate of 16 mg/min. while the solution was irradiated with 254 nm ultra-violet radiation (UV). The transmission at 25% dilution increased from 21%T to 53%T in 15 minutes. The temperature dropped from 54° C. to 47° C. during this time.

B. The example was repeated increasing the $H_2O_2$ to 1.0%. The transmission increased from 21%T to 59%T in 15 minutes.

C. Example 2B was repeated with 0.3% hydrogen peroxide instead of 1.0% and without added ultra-violet. The transmission increased from 21%T to 75%T in 15 minutes.

The Comparative Examples 3 and 4 confirm that the color of the lignin-containing effluent is composed of a variety of compounds, some of which can be decolorized easily in the pH range of 7 to 10, and some of which are extremely refractory, even to ozone.

It was observed that an undetermined quantity of the ozone sparged into the samples was not absorbed by the solution.

EXAMPLE 1

Ozone/Hydrogen Peroxide/UV

Samples of mixed effluent from a pulp mill were adjusted initially to a pH between 7.0 and about 8 and were treated with ozone alone (Run A1 and A2), ozone plus hydrogen peroxide (Run B1 and B2), and ozone, plus hydrogen peroxide and UV (Run C). The pH of the samples generally dropped during the reaction. The data reflects the ozone consumed in the experiment rather than the ozone fed as in Comparative Examples 3 and 4. The temperature averaged 62°–70° C. in all cases and drifted down during the runs. The oxidants were added at a uniform rate through each run. The results are reported in Table II as % decrease in absorbance (% color decrease).

In Runs A1 and A2, the samples consumed 342 (7.1 mmoles) and 242 mg/l (5.0 mmoles) of ozone per liter in 30 minutes. However, the color reduction of both samples was the same (83%).

In Run B1 the color reduction was 78% in 20 minutes after consumption of 186 mg/l (3.9 mmoles) ozone and 64 mg/l (1.9 mmoles) $H_2O_2$, and the color reduction was 88% after 30 minutes after consumption of 262 mg/l (5.4 mmoles) ozone and 150 mg/l (4.4 mmoles) $H_2O_2$.

In Run B2 the color reduction was 81% in 20 minutes after consumption of 113 mg/l (2.4 mmoles) ozone and 65 mg/l (1.9 mmoles) $H_2O_2$. Run C was comparable to Run B2 except the sample was irradiated with 254 nm UV. In 20 minutes the color was reduced 85% after consumption of 118 mg/l (2.4 mmoles) ozone and 48 mg/l (1.9 mmoles) $H_2O_2$; the color was reduced 88% in 30 minutes after consumption of 262 mg/l (5.4 mmoles) ozone and 150 mg/l (4.4 mmoles) $H_2O_2$.

These runs indicate that rate of decrease in color is initially very high with ozone, dropping with time. The results also indicate that the effect of UV radiation is not detectable under the experimental conditions. This is very unexpected in view of the teaching of U.S. Pat. No. 4,792,407 to Zeff et al. The results also indicate that while ozone by itself is very effective to decolorize lignin-containing solutions the combination of ozone with hydrogen peroxide results in unexpected added color removal. It is particularly surprising that the combination of hydrogen peroxide with ozone was more effective than almost twice the amount of ozone alone.

TABLE I

COMPARATIVE EXAMPLE 1
% TRANSMISSION OF PULP MILL EFFLUENT

| pH | Temp. °C. | g/l $H_2O_2$ 0.5 | 1.5 |
|---|---|---|---|
| | | % T after 30 mins. | |
| 8.75 | 46 | 15.6 | 19.4 |
| 8.75 | 63 | 17.6 | 22.2 |
| 9.3 | 67–70 | | 23.6 |
| 10.25 | 46 | 23.6 | 31.0 |
| 10.25 | 63 | 19.6 | 25.8 |
| | | % T after 10 mins. | |
| 8.75 | 46 | 12.8 | 15.6 |
| 8.75 | 63 | 14.8 | 19.2 |
| 9.3 | 65–70 | | 17.8 |
| 10.25 | 46 | 16.2 | 20.4 |
| 10.25 | 63 | 19.2 | 24.0 |

TABLE II

OZONE/HYDROGEN/UV EFFECTS (EXAMPLE 1)

| Run No. | 20 minutes | | | | 30 minutes | | | |
|---|---|---|---|---|---|---|---|---|
| | mmoles/l | | | % Color Loss | mmoles/l | | | % Color Loss |
| | $O_3$ | $H_2O_2$ | UV | | $O_3$ | $H_2O_2$ | UV | |
| A1 | — | — | — | — | 7.1 | — | — | 83 |
| A2 | — | — | — | — | 5.0 | — | — | 83 |
| B1 | 3.9 | 1.9 | — | 78 | 5.4 | 4.4 | — | 88 |
| B2 | 2.4 | 1.9 | — | 81 | | | | |
| C | 2.4 | 1.9 | Yes | 85 | 5.4 | 4.4 | Yes | 88 |

I claim:
1. A process for decreasing the color of an aqueous lignin-containing solution comprising the steps of:
   a. adjusting the pH of the solution to between pH 5 and 10,
   b. incorporating sufficient hydrogen peroxide into the solution to maintain a concentration of about 0.5 millimoles per liter for at least 20 minutes, and
   c. incorporating sufficient ozone into the solution to provide from 1 to 3 moles of ozone per mole of hydrogen peroxide incorporated in step b.

2. The process of claim 1 wherein the pH is adjusted between pH 6 and 8.

3. The process of claim 1 wherein sufficient ozone is incorporated into the solution to provide about 2 to 3 moles of ozone per mole of hydrogen peroxide incorporated in step b.

4. The process of claim 2 wherein sufficient ozone is incorporated into the solution to provide about 2 to 3 moles of ozone per mole of hydrogen peroxide incorporated in step b.

* * * * *